(12) United States Patent
Park et al.

(10) Patent No.: US 11,423,912 B2
(45) Date of Patent: Aug. 23, 2022

(54) METHOD AND ELECTRONIC DEVICE FOR PROCESSING AUDIO SIGNAL ON BASIS OF RESOLUTION SET ON BASIS OF VOLUME OF AUDIO SIGNAL

(71) Applicant: Samsung Electronics Co., Ltd., Gyeonggi-do (KR)

(72) Inventors: Sangsoo Park, Gyeonggi-do (KR); Jaeha Park, Gyeonggi-do (KR); Dongmoon Ok, Gyeonggi-do (KR); Gangyoul Kim, Gyeonggi-do (KR); Kiwon Kim, Gyeonggi-do (KR); Hyunjoong Kim, Gyeonggi-do (KR); Vadim Kudryavtsev, Gyeonggi-do (KR); Mira Seo, Gyeonggi-do (KR); Chulmin Choi, Gyeonggi-do (KR); Hochul Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

(21) Appl. No.: 16/764,072

(22) PCT Filed: Nov. 30, 2018

(86) PCT No.: PCT/KR2018/014970
§ 371 (c)(1),
(2) Date: May 14, 2020

(87) PCT Pub. No.: WO2019/107973
PCT Pub. Date: Jun. 6, 2019

(65) Prior Publication Data
US 2020/0388289 A1    Dec. 10, 2020

(30) Foreign Application Priority Data
Nov. 30, 2017   (KR) .......................... 10-2017-0162602

(51) Int. Cl.
*G10L 19/002* (2013.01)
*G06F 3/16* (2006.01)

(52) U.S. Cl.
CPC .............. *G10L 19/002* (2013.01); *G06F 3/16* (2013.01)

(58) Field of Classification Search
CPC ........... G10L 19/002; G06F 3/16; G06F 3/165
See application file for complete search history.

(56) References Cited

U.S. PATENT DOCUMENTS 6,240,388 B1   5/2001   Fukuchi
7,623,550 B2   11/2009  Forbes
(Continued)

FOREIGN PATENT DOCUMENTS

JP   H10-28057 A      1/1998
JP   2017-152067 A    8/2017
(Continued)

OTHER PUBLICATIONS

European Search Report dated Dec. 22, 2020.
Notice of Preliminary Rejection dated Apr. 5, 2022.

*Primary Examiner* — Fan S Tsang
*Assistant Examiner* — David Siegel
(74) *Attorney, Agent, or Firm* — Cha & Reiter, LLC

(57) ABSTRACT

Various embodiments of the present invention relate to a device and method for processing an audio signal by using a setting related to a volume of an audio signal in an electronic device. The electronic device may comprise a sound output device and a processor, wherein the processor is configured to: check a setting related to a volume of an audio signal to be output using the sound output device; when the setting related to the volume falls into a first designated range, process the audio signal in a state where the range of the volume is set to have a first resolution; when the setting related to the volume falls into a second desig- (Continued)

nated range, process the audio signal in a state where the range of the volume is set to have a second resolution; and output the audio signal by using the sound output device, the audio signal having been processed in a state where the range of the volume is set to have a resolution corresponding to one of the first resolution and the second resolution. Other embodiments may be possible.

18 Claims, 12 Drawing Sheets

(56) References Cited

U.S. PATENT DOCUMENTS

| | | | |
|---|---|---|---|
| 8,135,147 B2* | 3/2012 | Hong | H03G 3/002 |
| | | | 381/104 |
| 8,989,884 B2 | 3/2015 | Guetta et al. | |
| 2006/0109993 A1* | 5/2006 | Burger | H04R 25/505 |
| | | | 381/312 |
| 2007/0206820 A1* | 9/2007 | Ikawa | H03G 1/0088 |
| | | | 381/104 |
| 2007/0244587 A1* | 10/2007 | Yamamoto | H03G 3/002 |
| | | | 381/104 |
| 2009/0190780 A1 | 7/2009 | Nagaraja et al. | |
| 2015/0036842 A1 | 2/2015 | Robinson | |
| 2016/0165058 A1 | 6/2016 | Vander Mey et al. | |
| 2017/0242652 A1 | 8/2017 | Park et al. | |
| 2019/0227767 A1* | 7/2019 | Yang | G06F 3/165 |

FOREIGN PATENT DOCUMENTS

| | | |
|---|---|---|
| KR | 10-2006-0057262 A | 5/2006 |
| KR | 10-2010-0129283 A | 12/2010 |

* cited by examiner

METHOD AND ELECTRONIC DEVICE FOR PROCESSING AUDIO SIGNAL ON BASIS OF RESOLUTION SET ON BASIS OF VOLUME OF AUDIO SIGNAL

CLAIM OF PRIORITY

This application is a National Phase Entry of PCT International Application No. PCT/KR2018/014970, which was filed on Nov. 30, 2018 and claims a priority to Korean Patent Application No. 10-2017-0162602, which was filed on Nov. 30, 2017, the contents of which are incorporated herein by reference.

TECHNICAL FIELD

Various embodiments of the disclosure relate to an apparatus and a method for processing an audio signal by using a setting related to a volume of the audio signal in an electronic device.

BACKGROUND ART

With the enhancement of information and communication technology and semiconductor technology, electronic devices may provide various functions such as a broadcasting function, an audio output function, a wireless Internet function, a camera function, a user authentication function, or an electronic payment function. As user demand for listening to high-quality sound sources increases, electronic devices may provide an audio module capable of reproducing high-quality sound sources.

DISCLOSURE OF INVENTION

Technical Problem

An electronic device may increase a bit number for quantization of an audio signal in order to provide a high-quality sound source through an audio module. However, due to the increase of the bit number for quantization of the audio signal, a load and current consumption of the electronic device may increase and stability of the system of the electronic device may be reduced.

Various embodiments of the disclosure may provide an apparatus and a method for processing an audio signal by using a setting related to a volume of the audio signal in an electronic device.

Solution to Problem

According to various embodiments of the disclosure, an electronic device may include a sound output device and a processor, and the processor may be configured to: identify a setting related to a volume of an audio signal to be outputted by using the sound output device; when the setting related to the volume falls into a first designated range, process the audio signal in a state where a range of the volume is set to have a first resolution; when the setting related to the volume falls into a second designated range, process the audio signal in a state where the range of the volume is set to have a second resolution; and output the audio signal which is processed in the state where the range of the volume is set to have one corresponding resolution of the first resolution and the second resolution by using the sound output device.

According to various embodiments of the disclosure, an operating method of an electronic device may include: identifying a setting related to a volume of an audio signal to be outputted by using a sound output device; when the setting related to the volume falls into a first designated range, processing the audio signal in a state where a range of the volume is set to have a first resolution; when the setting related to the volume falls into a second designated range, processing the audio signal in a state where the range of the volume is set to have a second resolution; and outputting the audio signal which is processed in the state where the range of the volume is set to have one corresponding resolution of the first resolution and the second resolution by using the sound output device.

According to various embodiments of the disclosure, a computer readable recording medium may have a program recorded thereon to perform a method including: identifying a setting related to a volume of an audio signal to be outputted by using a sound output device; when the setting related to the volume falls into a first designated range, processing the audio signal in a state where a range of the volume is set to have a first resolution; when the setting related to the volume falls into a second designated range, processing the audio signal in a state where the range of the volume is set to have a second resolution; and outputting the audio signal which is processed in the state where the range of the volume is set to have one corresponding resolution of the first resolution and the second resolution by using the sound output device.

Advantageous Effects of Invention

An electronic device and an operating method thereof according to various embodiments of the disclosure can provide a high-quality sound source to a user and can reduce current consumption of a battery, by increasing a resolution for processing an audio signal only in a range where a user easily recognizes a noise in a setting related to a volume.

BEST MODE FOR CARRYING OUT THE INVENTION

Various embodiments of the present disclosure are described below in detail with reference to the accompanying drawings. And, in describing an embodiment of the present disclosure, related well-known functions or constructions are not described in detail since they would obscure the gist of the present disclosure in unnecessary detail. And, the terms described below, which are terms defined considering functions of the present disclosure, may be modified according to user and operator's intention or practice, etc. Therefore, the definition should be given on the basis of the content throughout the present specification.

Figure 1:
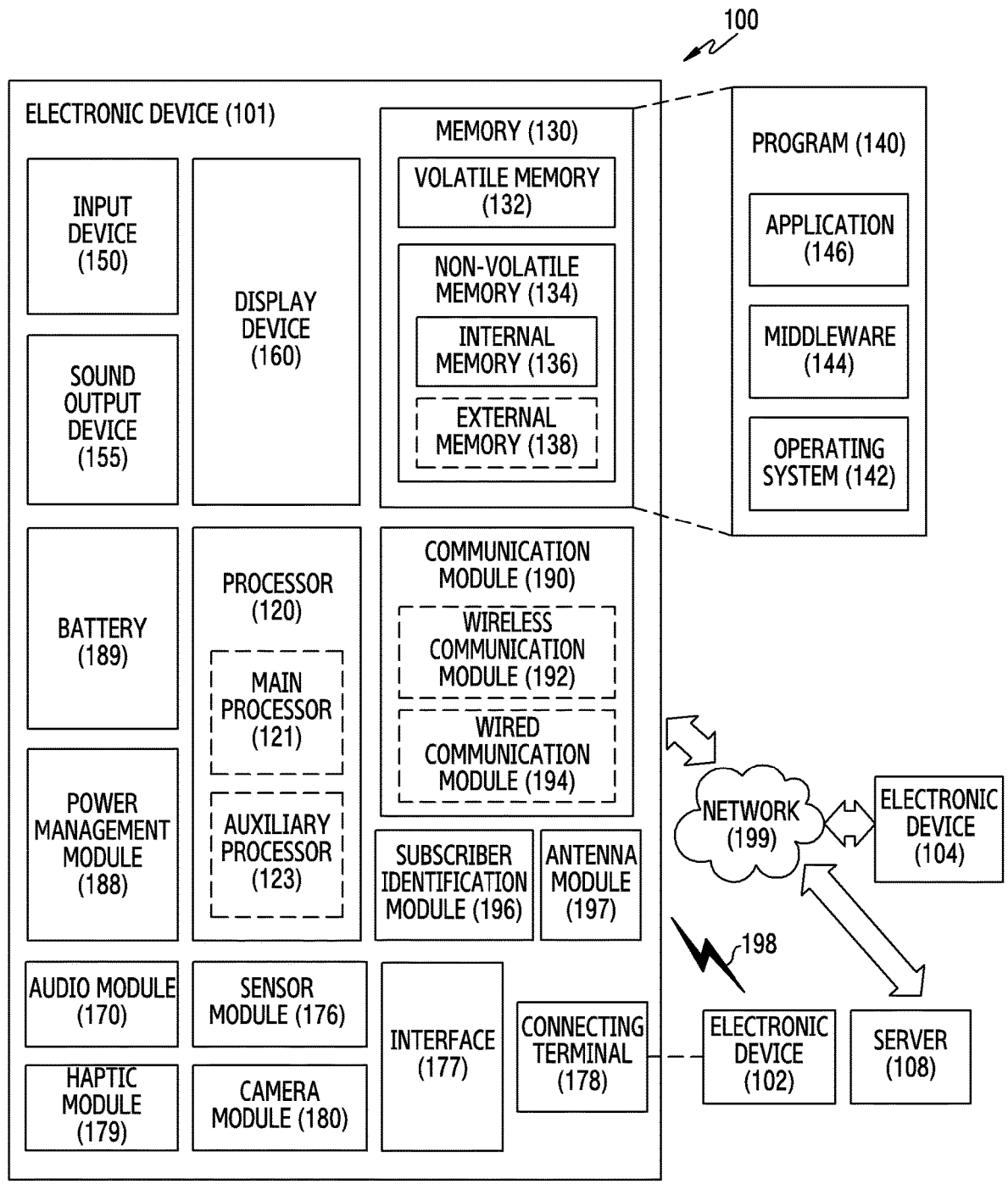
FIG. 1 illustrates a block diagram of an electronic device for processing an audio signal by using a setting related to a volume of the audio signal in a network environment according to an embodiment of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
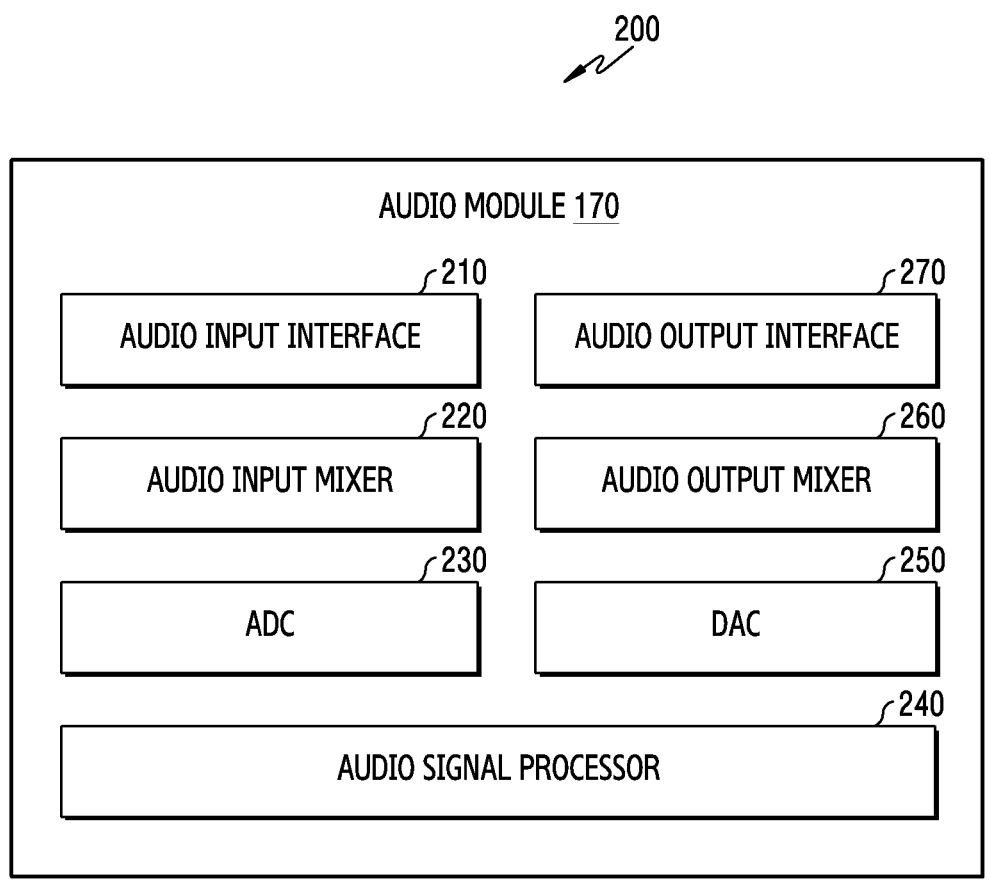
FIG. 2 illustrates a block diagram of an audio module according to an embodiment of the disclosure.

FIG. 2 is a block diagram 200 illustrating the audio module 170 according to an embodiment of the disclosure.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device may include a sound output device and a processor, and the processor may be configured to: identify a setting related to a volume of an audio signal to be outputted by using the sound output device; when the setting related to the volume falls into a first designated range, process the audio signal in a state where a range of the volume is set to have a first resolution; when the setting related to the volume falls into a second designated range, process the audio signal in a state where the range of the volume is set to have a second resolution; and output the audio signal which is processed in the state where the range of the volume is set to have one corresponding resolution of the first resolution and the second resolution by using the sound output device.

According to various embodiments, the processor may be configured to identify, as at least a portion of the operation of identifying the setting related to the volume, at least one of an audio output level of the sound output device, a size of an amplitude of the audio signal, or an average of the amplitude of the audio signal.

According to various embodiments, the processor may be configured to: as at least a portion of the operation of processing the audio signal in the state where the range of the volume is set to have the first resolution, process the audio signal in a state where a quantization bit of the audio signal is set to a first bit; and, as at least a portion of the operation of processing the audio signal in the state where the range of the volume is set to have the second resolution, process the audio signal in a state where the quantization bit of the audio signal is set to a second bit.

According to various embodiments, the processor may be configured to: when the audio output level of the sound output device is higher than a reference level, process the audio signal in a state where the range of the volume is set to have a first bit; and, when the audio output level of the sound output device is lower than the reference level, process the audio signal in a state where the range of the volume is set to have a second bit.

According to various embodiment, the processor may be configured to: identify an output state of the sound output device before processing the audio signal at one of the first resolution and the second resolution that is determined; and, when there is no output signal outputted from the sound output device on the basis of a result of the identification, set the range of the volume to have any one of the first resolution or the second resolution.

According to various embodiments, when the audio signal is outputted from the sound output device on the basis of the result of the identification, the processor may be configured to set the range of the volume to have any one of the first resolution or the second resolution at a time that the audio signal which is being outputted finishes.

According to various embodiments, the processor may be configured to: identify the size of the amplitude of the audio signal; when a continuous length of the audio signal having an amplitude size greater than or equal to a reference amplitude size is longer than a designated length, process the audio signal in the state where the range of the volume is set to have the first resolution; and, when the continuous length of the audio signal having the amplitude size greater than or equal to the reference amplitude size is shorter than the designated length, process the audio signal in the state where the range of the volume is set to have the second resolution.

According to various embodiments, the processor may be configured to: identify the average of the amplitude of the audio signal; when the average of the amplitude of the audio signal is greater than a reference value, process the audio signal in the state where the range of the volume is set to have the first resolution; and, when the average of the amplitude of the audio signal is less than the reference value, process the audio signal in the state where the range of the volume is set to have the second resolution.

According to various embodiments, the processor may be configured to: detect a user input to change the audio output level of the sound output device; and identify the setting related to the volume of the audio signal to be outputted by using the sound output device, on the basis of the detected user input.

Figure 3A:
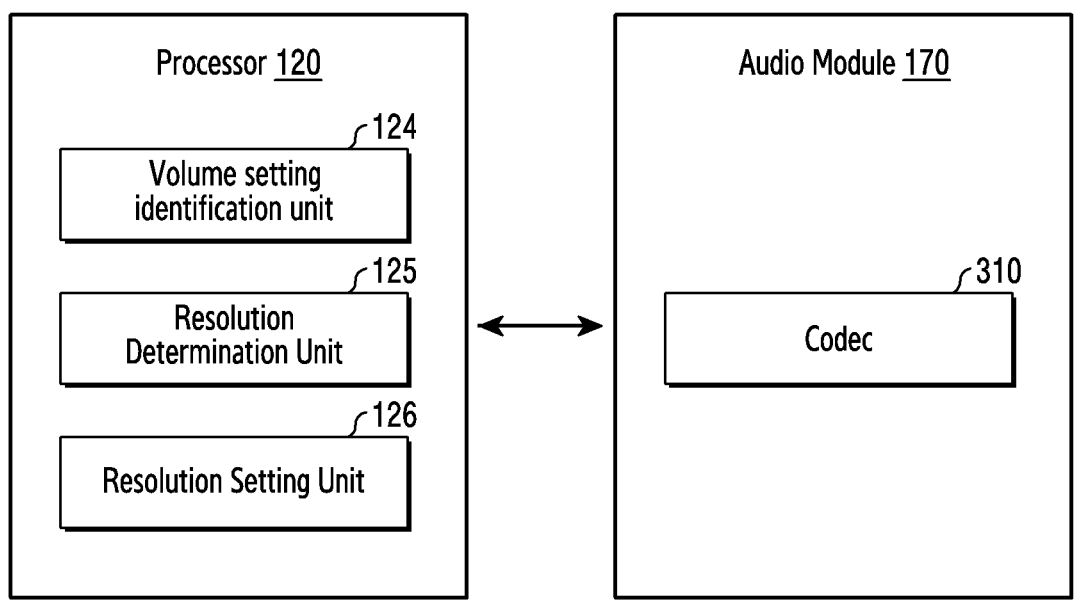
FIG. 3A illustrates a block diagram of a processor according to an embodiment of the disclosure.
Figure 3B:
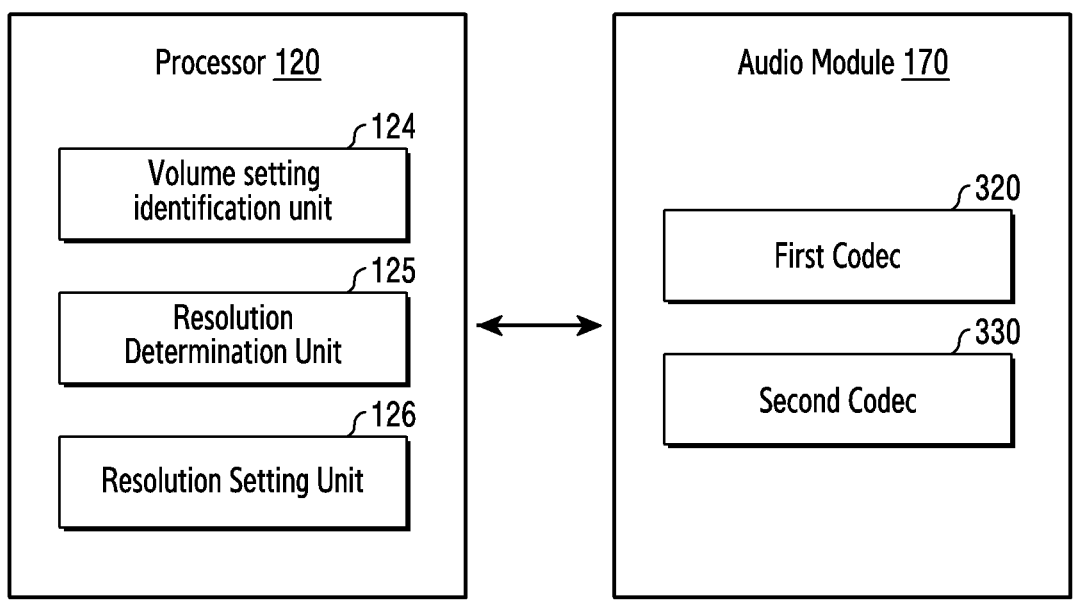
FIG. 3B illustrates a block diagram of a processor according to an embodiment of the disclosure.

FIGS. 3A and 3B are block diagrams of a processor according to various embodiments of the disclosure. An electronic device in the following description may include the electronic device 101 of FIG. 1 or at least a portion (for example, the processor 120) of the electronic device 101.

Referring to FIGS. 3A and 3B, the processor 120 of the electronic device 101 of FIG. 1 may include a volume setting identification unit 124, a resolution determination unit 125, and a resolution setting unit 126.

The volume setting identification unit 124 may identify a setting related to a volume of an audio signal to be outputted by using the sound output device 155 of FIG. 1, for example. For example, the setting related to the volume of the audio signal may include at least one of an audio output level of the sound output device 155 (for example, a speaker), a size of an amplitude of the audio signal, or an average of the amplitude of the audio signal.

The resolution determination unit 125 may determine, for example, whether the setting related to the volume falls into a first designated range or a second designated range. For example, the first designated range may be a partial range of the audio output level (for example, a range exceeding audio output level 4) of the sound output device 155, a partial range of the size of the amplitude of the audio signal, or a partial range of the average of the amplitude of the audio signal. For example, the second designated range may be the other range except for the first designated range. For example, the second designated range may be the other range (for example, a range less than or equal to audio output level 4) except for the partial range of the audio output level of the sound output device 155, the other range except for the partial range of the size of the amplitude of the audio signal, or the other range except for the partial range of the average of the amplitude of the audio signal. In another example, the second designated range may be a partial range (for example, a range of audio output levels 5-8 inclusive) different from the partial range of the audio output level, a partial range different from the partial range of the size of the amplitude of the audio signal, or a partial range different from the partial range of the average of the amplitude of the audio signal. The resolution setting unit 126 may set the range of the volume to have a first resolution or a second resolution, for example. For example, the second resolution may be higher than the first resolution. For example, the first resolution may be 16 bits, and the second resolution may be 25 bits or 32 bits. For example, the range of the volume may be a range of a volume of an audio signal to be outputted.

According to an embodiment, the processor 120 may set the audio module 170 of FIG. 1. For example, as shown in FIG. 3A, the audio module 170 may include a codec 310 (for example, a configuration including at least one of the ADC 230 of FIG. 2, the audio signal processor 240 of FIG. 2, or the DAC 250 of FIG. 2). For example, the codec 310 may be a codec that is set to have any one resolution of the first resolution (for example, a first bit) or the second resolution (for example, a second bit). In addition, the processor 120 may change the resolution of the codec 310 to the first resolution or the second resolution. For example, the codec 310 may be changed to have the first resolution or the second resolution. For example, the processor 120 may change the resolution of the codec 310 to the first resolution or the second resolution, on the basis of the setting related to the volume of the audio signal to be outputted.

According to an embodiment, as shown in FIG. 3B, the audio module 170 may include a first codec 320 set to have the first resolution and a second codec 33 set to have the second resolution. For example, the processor 120 may select the first codec 320 or the second codec 330 as a codec to process the audio signal, on the basis of the setting related to the volume of the audio signal to be outputted.

According to an embodiment, the processor 120 may process the audio signal in a state where the range of the volume is set to have the first resolution or the second resolution, and may output the processed audio signal by using the sound output device 155.

According to an embodiment, while the audio signal is being outputted, the processor 120 may identify the setting related to the volume of the audio signal which is being outputted, by using the sound output device 155, and may set the setting related to the volume of the audio signal which is being outputted to the first resolution or the second resolution.

Figure 4:
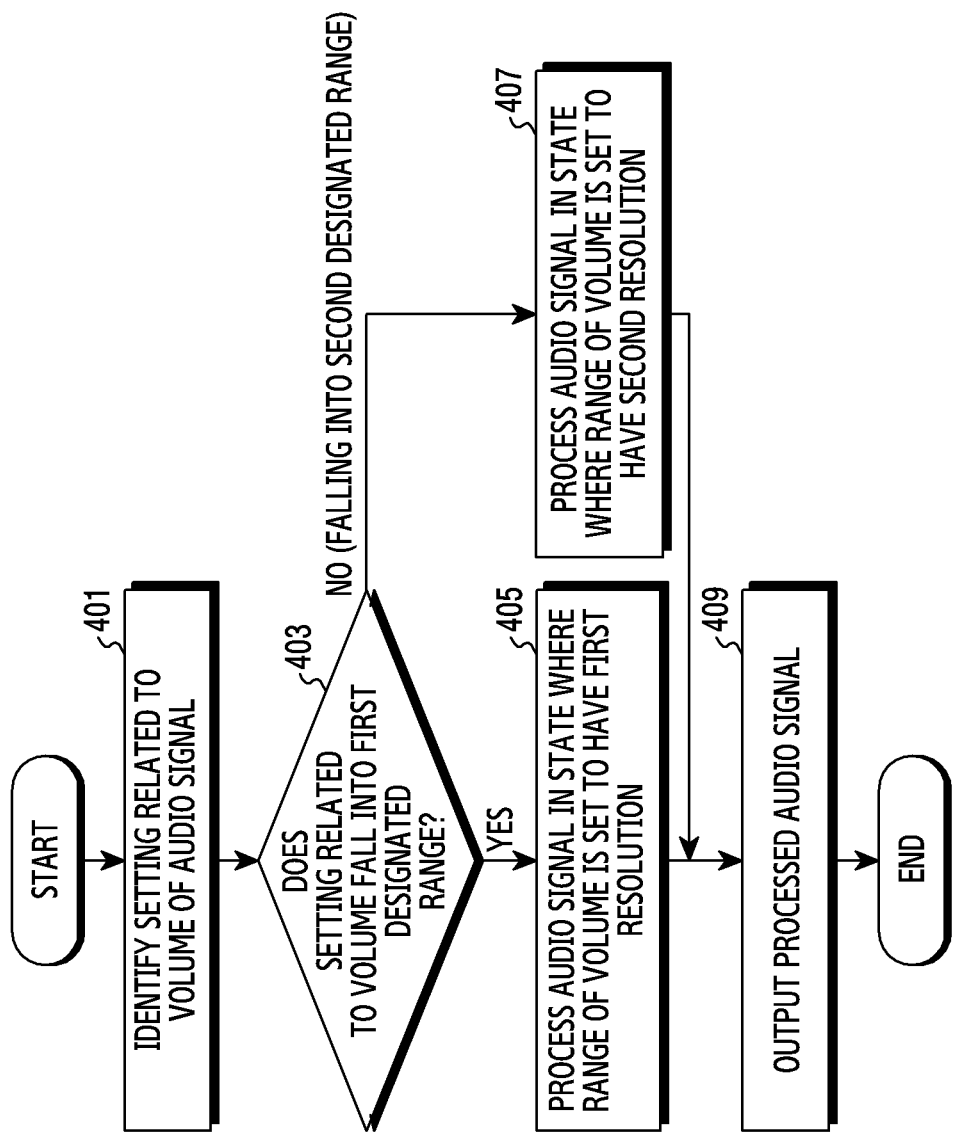
FIG. 4 illustrates a flowchart for processing an audio signal by using a setting related to a volume of the audio signal in an electronic device according to an embodiment of the disclosure.

FIG. 4 is a flowchart for processing an audio signal by using a setting related to a volume of the audio signal in an electronic device according to various embodiments of the disclosure. In the following description, the electronic device may include the electronic device 101 of FIG. 1, at least a portion of the electronic device 101 (for example, the processor 120, the sound output device 155), the audio module 170 of FIG. 2, or the processor 120 of FIG. 3.

Referring to FIG. 4, the electronic device 401 may identify a setting related to a volume of an audio signal to be outputted in operation 401. For example, the processor 120 may identify the setting related to the volume of the audio signal to be outputted by using the sound output device 155 of FIG. 1, For example, the setting related to the volume of the audio signal may include at least one of an audio output level of the sound output device 155 (for example, a speaker), a size of an amplitude of the audio signal, or an average of the amplitude of the audio signal. For example, the audio output level of the sound output device 155 may be an audio volume level that may be set on the basis of a user input. For example, the range of the amplitude of the audio signal may be changed according to the audio volume level. Herein, the range of the amplitude of the audio signal may be defined by a maximum amplitude of the audio signal and a minimum amplitude of the audio signal. That is, the electronic device 101 may change the range of the amplitude of the audio signal to be outputted by changing the audio volume level. The user input may be detected by a hardware key or a soft key of the electronic device 101.

According to an embodiment, the electronic device 101 may identify the setting related to the volume of the audio signal to be outputted, on the basis of a user input. For example, when a user input of changing the audio output level of the sound output device 155 is detected through the input device 150 of FIG. 1, the processor 120 may identify the setting related to the volume of the audio signal to be outputted, on the basis of the detected user input.

In operation 403, the electronic device 101 may determine Whether the setting related to the volume falls into a first designated range. For example, the first designated range may be a partial range of the audio output level of the sound output device 155, a partial range of the size of the amplitude of the audio signal, or a partial range of the average of the amplitude of the audio signal. For example, when the first designated range is designated as a range exceeding audio output level 4 and the audio output level of the sound output device 155 is set to 5, the processor 120 may determine that the setting related to the volume falls into the first designated range.

When the setting related to the volume falls into the first designated range, the electronic device 101 may proceed to operation 405 to process the audio signal in a state where the range of the volume is set to have a first resolution. For example, the first resolution may be lower than a second resolution. For example, the first resolution may be 16 bits and the second resolution may be 24 bits or 32 bits. For example, the range of the volume may be a range of a volume of an audio signal to be outputted.

On the other hand, when the setting related to the volume falls into a second designated range, the electronic device 101 may proceed to operation 407 to process the audio signal in a state where the range of the volume is set to have the second resolution. For example, the second designated range may be the other range except for the first designated range. For example, the second designated range may be the other range except for the partial range of the audio output level of the sound output device 155, the other range except for the partial range of the size of the amplitude of the audio signal, or the other range except for the partial range of the average of the amplitude of the audio signal. In another example, the second designated range may be a partial range different from the partial range of the audio output level (for example, a range of audio output levels 5-8 inclusive) of the sound output device 155, a partial range different from the partial range of the size of the amplitude of the audio signal, or a partial range different from the partial range of the average of the amplitude of the audio signal.

According to an embodiment, the first designated range may be higher than the second designated range. For example, when the audio output level is 1-15, the first designated range may be 5-15 and the second designated range may be 1-4. Herein, this means that, as an integer of the audio output level increases, the volume level of the electronic device 101 increases (for example, volume-up). In addition, in the case of the size of the amplitude of the audio signal or the average of the amplitude, a lower limit value of the first designated range may be greater than or equal to an upper limit value of the second designated range.

In operation 409, the electronic device 101 may output the audio signal which is processed in the state where the range of the volume is set to one corresponding resolution of the first resolution and the second resolution, by using the sound output device. For example, a sound that is outputted on the basis of the audio signal processed with the second resolution being set may have higher quality than a sound that is outputted on the basis of the audio signal processed with the first resolution being set with reference to the same volume. Accordingly, by processing the audio signal at a high resolution only in the second designated range where a user can easily recognize a noise, power consumption can be reduced and a high-quality sound can be provided to the user.

According to an embodiment, the electronic device 101 may finish the procedure after operation 409. Alternatively, the electronic device 101 may perform operations 401 to 409 periodically or every time the setting related to the volume is changed.

According to an embodiment, three or more designated ranges may be set unlike in FIG. 4. For example, the processor 120 may set the designated range to first to third designated ranges. For example, when the audio output level of the sound output device 155 is high according to a masking effect, the user may not recognize a noise of the electronic device 101. However, when the audio output level of the sound output device 155 is low, the user may recognize a noise of the electronic device 101 and thus may need to increase a resolution of the audio signal at the low audio output level. Accordingly, when the audio output level is 1 to 15, the processor 120 may set the first designated range to 5 to 15, may set the second designated range to 3 to 4, and may set the third designated range to 1 to 2. In addition, the first designated range to the third designated range may correspond to a first resolution to a third resolution, respectively, and the third resolution may be higher than the second resolution. That is, the electronic device 101 may segment the low range of the audio output level and set the resolution of the audio signal, thereby preventing noise recognition of the user.

Figure 5:
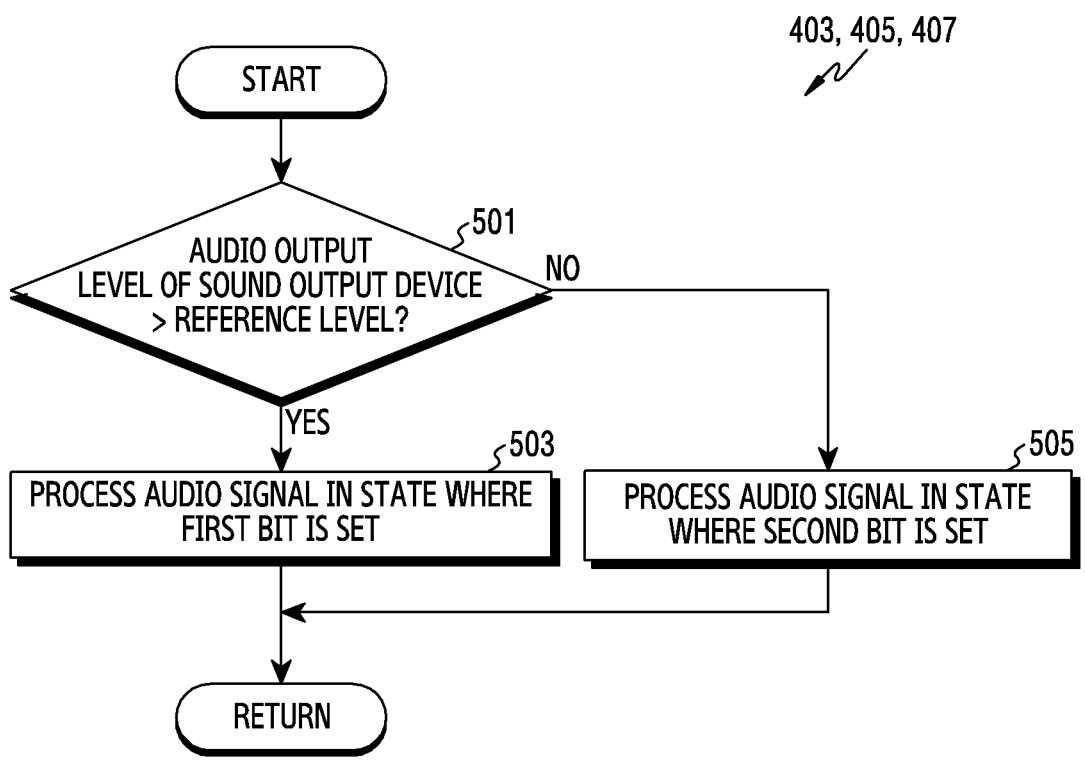
FIG. 5 illustrates a flowchart for processing an audio signal on the basis of an audio output level of a sound output device in an electronic device according to an embodiment of the disclosure.

FIG. 5 is a flowchart for processing an audio signal on the basis of an audio output level of a sound output device in an electronic device according to various embodiments of the disclosure. Hereinbelow, an operation of processing the audio signal in operations 403, 405, 407 of FIG. 4 will be described. In the following description, the electronic device may include the electronic device 101 of FIG. 1, at least a portion (for example, the processor 120, the sound output device 155) of the electronic device 101, the audio module 170 of FIG. 2, or the processor 120 of FIG. 3.

Referring to FIG. 5, the electronic device 101 may determine whether an audio output level of the sound output device 155 of FIG. 1 exceeds a reference level in operation 501. For example, the audio output level of the sound output device 155 may be an audio volume level of the electronic device 101 that may be set on the basis of a user input. The user input may be detected by a hardware key or a soft key of the electronic device 101. For example, the reference level may be any one of the audio output levels of the electronic device 101, For example, when the reference level is 4 and the identified audio level is 5, the processor 120 may determine that the audio output level exceeds the reference level.

When the audio output level of the sound output device 155 exceeds the reference level, the electronic device 101 may proceed to operation 503 to process the audio signal in a state where the range of the volume is set to have a first bit. For example, when the audio output level exceeds the reference level, the processor 120 may set the range of the volume to have the first bit by setting the audio module 170 of FIG. 1 to have the first bit. For example, the processor 120 may set a quantization hit number which is applied while an analogue signal is being quantized to the first bit. For example, the first bit may be 16 bits. For example, the processor 120 may process the audio signal in a state where the audio module 170 is set to have the first bit. For example, the processor 120 may quantize the audio signal to 16 bits. Herein, the quantization may refer to a process of approximating an amplitude value of a sampled audio signal, and the quantization bit number may refer to an interval for approximating the amplitude value of the sampled audio signal.

On the other hand, when the audio output level of the sound output device 155 is lower than the reference level, the electronic device 101 may proceed to operation 505 to process the audio signal in a state where the range of the volume is set to have a second bit. For example, when the audio output level is lower than the reference level, the processor 120 may set the range of the volume to have the second bit by setting the audio module 170 to have the second bit. For example, the processor 120 may set the quantization bit number which is applied while the analogue signal is being quantized to the second bit. For example, the second bit may be 24 bits or 32 bits. For example, the processor 120 may process the audio signal in a state where the audio module 170 is set to have the second bit. For example, the processor 120 may quantize the audio signal to 24 bits or 32 bits.

According to an embodiment, the second bit may be higher than the first bit in bit number, and the first bit and the second bit may not be limited to a specific value (16 bits, 24 bits, or 32 bits).

The electronic device 101 may return to perform operation 409 of FIG. 4 after completing operation 503 or 505. However, this should not be considered as limiting.

Figure 6:
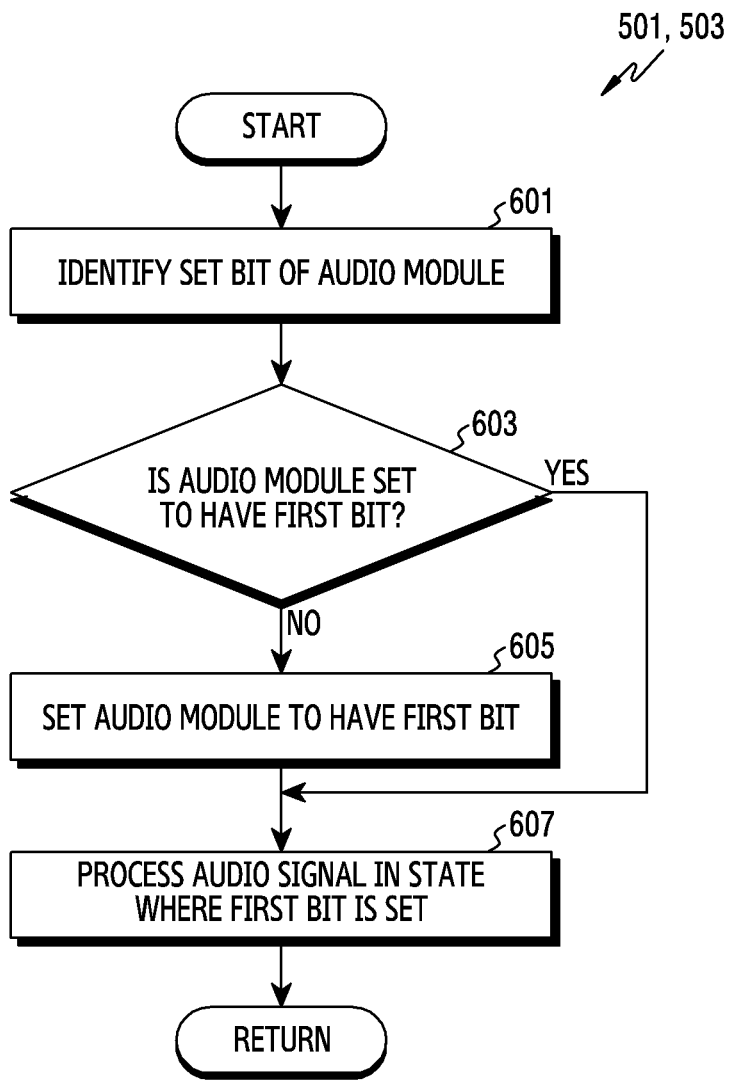
FIG. 6 illustrates a flowchart for processing an audio signal in a state where a first bit is set in an electronic device according to an embodiment of the disclosure.

FIG. 6 is a flowchart for processing an audio signal in a state where a first bit is set in an electronic device according to various embodiments of the disclosure. Hereinbelow, an operation of processing the audio signal in operations 501 and 503 of FIG. 5 will be described. In the following description, the electronic device may include the electronic device 101 of FIG. 1, at least a portion of the electronic device 101 (for example, the processor 120, the sound output device 155), the audio module 170 of FIG. 2, or the processor 120 of FIG. 3.

Referring to FIG. 6, the electronic device 101 may identify a set bit of the audio module 170 of FIG. 1 in operation 601. For example, when the audio output level of the sound output device 155 of FIG. 1 exceeds the reference level, the processor 120 may identify whether a previous set bit of the audio module 170 is the first bit or the second bit.

In operation 603, the electronic device 101 may determine whether the audio module 170 is set to have the first bit. For example, the processor 120 may determine whether the identified set bit of the audio module 170 is the first bit.

When the audio module 2170 is set to have the first bit, the electronic device 101 may proceed to operation 607 to process the audio signal in the state where the range of the volume is set to have the first bit. For example, since the first hit that should be set as the audio output level exceeds the reference level is already set in the audio module 170, the processor 120 may process the audio signal without changing the set bit of the audio module 170.

On the other hand, when the audio module 170 is not set to have the first bit, the electronic device 101 may proceed to operation 605 to set the audio module 170 to have the first bit, and may proceed to operation 607 to process the audio signal in the state where the range of the volume is set to have the first bit.

The electronic device 101 may return to perform operation 409 of FIG. 4 after completing operation 607. However, this should not be considered as limiting.

Figure 7:
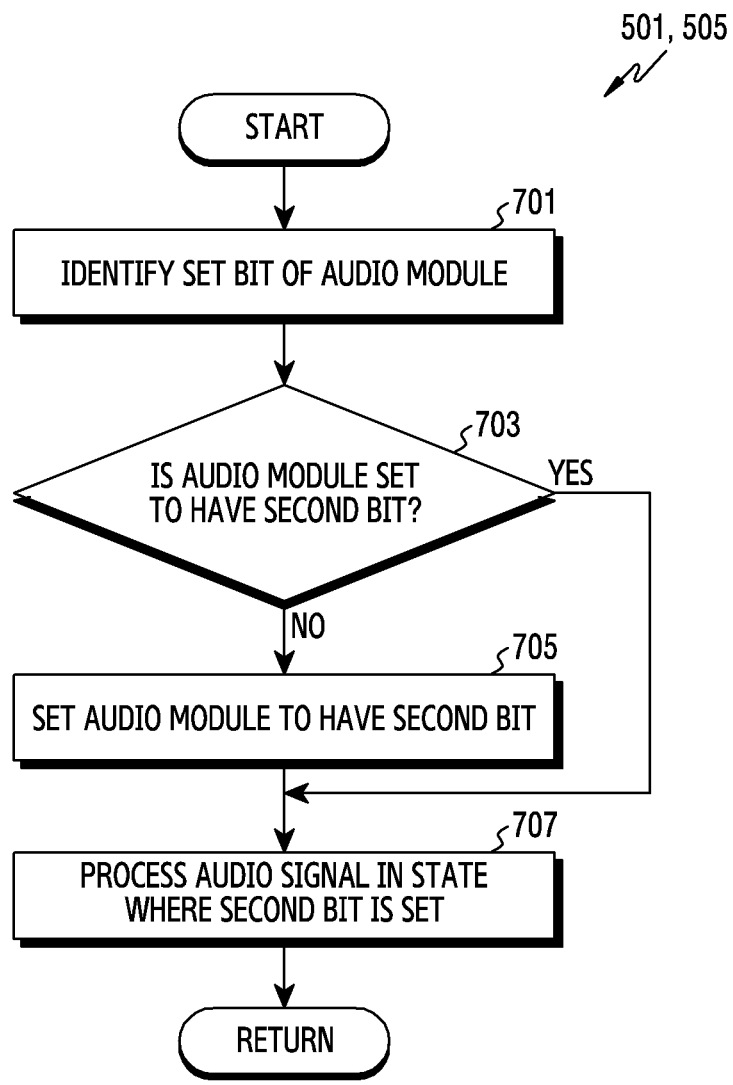
FIG. 7 illustrates a flowchart for processing an audio signal in a state where a second bit is set in an electronic device according to an embodiment of the disclosure.

FIG. 7 is a flowchart for processing an audio signal in a state where a second bit is set in an electronic device according to various embodiments of the disclosure. Hereinbelow, an operation of processing the audio signal in operations 501 and 505 of FIG. 5 will be described. In the following description, the electronic device may include the electronic device 101 of FIG. 1, at least a portion of the electronic device 101 (for example, the processor 120, the sound output device 1551, the audio module 170 of FIG. 2, or the processor 120 of FIG. 3.

Referring to FIG. 7, in operation 701, the electronic device 101 may identify a set hit of the audio module 170 of FIG. 1. For example, when the audio output level of the sound output device 155 of FIG. 1 is lower than the reference level, the processor 120 may identify whether a previous set bit of the audio module 170 is the first bit or the second bit.

In operation 703, the electronic device 101 may determine whether the audio module 170 is set to have the second bit. For example, the processor 120 may determine whether the identified set hit of the audio module 170 is the second bit.

When the audio module 170 is set to have the second bit, the electronic device 101 may proceed to operation 707 to process the audio signal in the state where the range of the volume is set to have the second bit. For example, since the second bit that should be set as the audio output level is lower than the reference level is already set in the audio module 170, the processor 120 may process the audio signal without changing the set bit of the audio module 170.

On the other hand, when the audio module 170 is not set to have the second bit, the electronic device 101 may proceed to operation 705 to set the audio module 179 to have the second bit, and may proceed to operation 707 to process the audio signal in the state where the second bit is set.

The electronic device 101 may return to perform operation 409 after completing operation 707. However, this should not be considered as limiting.

Figure 8:
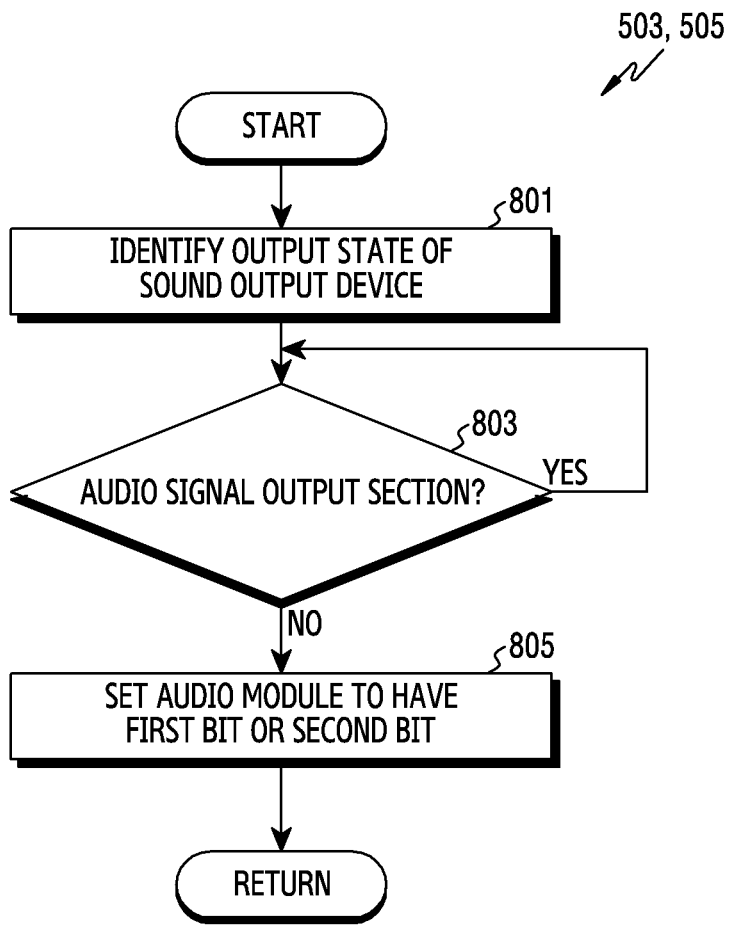
FIG. 8 illustrates a flowchart for setting a resolution of an audio module in an electronic device according to an embodiment of the disclosure.
Figure 9:
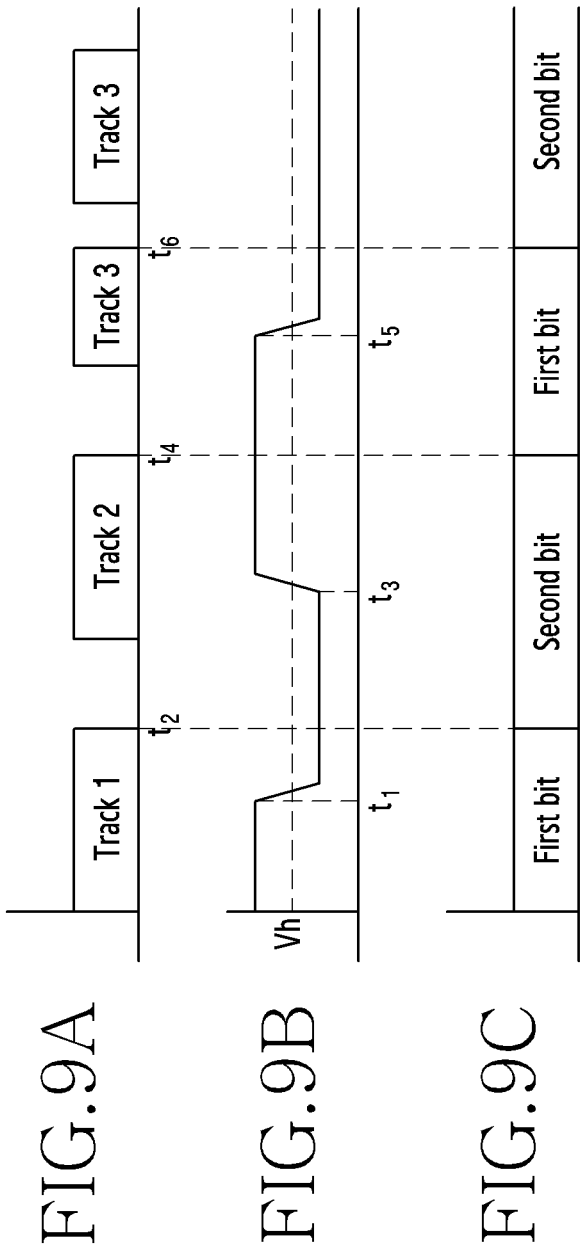
FIG. 9 illustrates a view illustrating an example of setting a resolution of an audio module in an electronic device according to an embodiment of the disclosure.

FIG. 8 is a flowchart for setting a resolution of an audio module in an electronic device according to various embodiments of the disclosure. FIG. 9 is a view Illustrating an example of setting the resolution of the audio module in the electronic device according to various embodiments of the disclosure. Hereinbelow, an operation of processing the audio signal in operations 503 and 505 of FIG. 5 will be described. In the following description, the electronic device may include the electronic device 101 of FIG. 1, at least a portion of the electronic device 101 (for example, the processor 120, the sound output device 155), the audio module 170 of FIG. 2, or the processor 120 of FIG. 3.

View (a) of FIG. 9 illustrates an operation of reproducing a plurality of Tracks included in an audio signal in sequence, and view (b) of FIG. 9 illustrates that the audio signal of the sound output device 155 changes with time. For example, in view (h) of FIG. 9, the Y-axis may indicate an audio output level, the X-axis may indicate time, and Vh may indicate a reference level. View (c) of FIG. 9 illustrates a set bit of the audio module 170 in sequence.

Referring to FIGS. 8 and 9, in operation 801, the electronic device 101 may identify an output state of the sound output device 155 of FIG. 1. For example, when it is determined that the audio module 170 is set to have the first resolution or the second resolution, the processor 120 may identify whether the output state of the sound output device 155 is in an audio signal output section or an audio signal binding section before performing the setting. For example, the audio signal may include Track 1, Track 2, and Track 3 as shown in FIG. 9. Herein, Track 1 to Track 3 may indicate sound sources. For example, the output section of the audio signal may be a section in which Track 1, Track 2, or Track 3 shown in view (a) of FIG. 9 is reproduced, and the binding section of the audio signal may be a section between Track 1, Track 2, or Track 3, or a section in which Track 3 is temporarily stopped. For example, in view (a) of FIG. 9, t2 may be a time at which Track 2 finishes, t4 may be a time at which Track 2 finishes, and t6 may be a time at which Track 3 is temporarily stopped.

In operation 803, the electronic device 101 may determine whether the output state of the sound output device 155 is in the audio signal output section, on the basis of a result of the identification. For example, when an audio output level lower than the reference level Vh is detected at a time t1 in view (b) of FIG. 9, the processor 120 may determine that the output state is in the audio signal output section at the time t1 or after the time t1. In addition, when an audio output level higher than the reference level Vh is detected at a time t3 in view (b) of FIG. 9, the processor 120 may determine that the output state is in the audio signal output section at the time t3 or after the time t3. In addition, when an audio output level lower than the reference level Vh is detected at a time t5 in view (b) of FIG. 9, the processor 120 may determine that the output state is in the audio signal output section at the time t5 or after the time t5.

When the output state of the sound output device 155 is in the audio signal output section (for example, the audio signal is being outputted), the electronic device 101 may continuously or periodically determine whether the output state of the sound output device 155 is in the audio signal output section. For example, when the audio signal output section finishes (or the binding section of the audio signal starts) at the time t2, the processor 120 may determine that the output state of the sound output device 155 is not in the output section, and may set the resolution of the audio module 170 (change from the first hit to the second hit) at the time t2 or after the time t2. In addition, the processor 120 may set the resolution of the audio module 170 (change to the first bit or the second bit) at the time t4, after the time t4, at the time t6, or after the time t6. That is, when the output level of the audio is lower or higher than the reference level, the processor 120 may set the resolution of the audio module 170 at the time the audio signal output period finishes or during the binding period of the audio signal.

On the other hand, when it is determined that the output state of the sound output device 155 is in the audio signal binding period (there is no audio signal outputted), the electronic device 101 may proceed to operation 805 to set the audio module 170 to have the first bit or the second bit. For example, when the audio output level exceeds or is lower than the reference level Vh during the binding section of the audio signal (for example, between t2 and a starting time of Track 2, or during a pause section of Track 3) although this is not illustrated, the processor 120 may immediately set the audio module 170 to have the first bit or the second bit.

The electronic device 101 may return to perform operation 409 of FIG. 4 after completing operation 805. However, this should not be considered as limiting.

Figure 10:
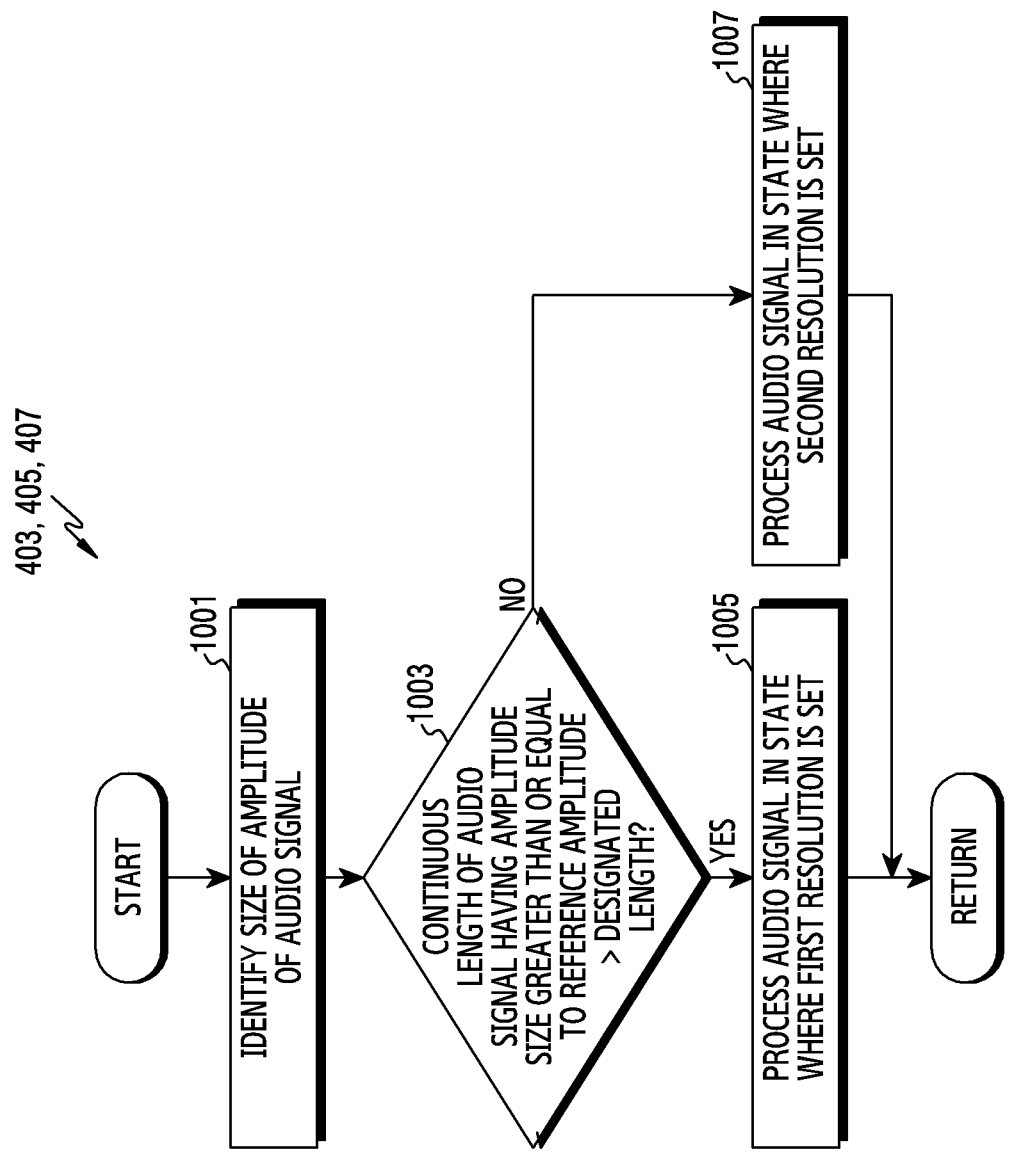
FIG. 10 illustrates a flowchart for processing an audio signal on the basis of a size of an amplitude of the audio signal in an electronic device according to an embodiment of the disclosure.

FIG. 10 is a flowchart for processing an audio signal on the basis of a size of an amplitude of the audio signal in an electronic device according to various embodiments of the disclosure. Hereinbelow, an operation of processing the audio signal in operations 403, 405, and 407 of FIG. 4 will be described. In the following description, the electronic device may include the electronic device 101 of FIG. 1, at least a portion of the electronic device 101 (for example, the processor 120, the sound output device 155), the audio module 170 of FIG. 2, or the processor 120 of FIG. 3.

Referring to FIG. 10, in operation 1001, the electronic device 101 may identify a size of an amplitude of an audio signal. For example, the processor 120 may identify the size of the amplitude of the audio signal to be outputted through the audio module 170. In addition, the processor 120 may identify a continuous length of the audio signal having an amplitude size greater than or equal to a reference amplitude size, on the basis of the size of the amplitude of the audio signal identified.

According to an embodiment, the processor 120 may monitor the audio signal which is being outputted in real time. For example, the processor 120 may identify the continuous length of the audio signal having the amplitude size greater than or equal to the reference amplitude size while monitoring the audio signal which is being outputted.

In operation 1003, the electronic device 101 may determine whether the continuous length of the audio signal having the amplitude size greater than or equal to the reference amplitude size is longer than a designated length. For example, the processor 120 may detect the continuous length of the audio signal having the amplitude size greater than or equal to the reference amplitude size through the audio module 170, and may determine whether the continuous length of the audio signal detected is longer than the designated length.

When the continuous length of the audio signal having the amplitude size greater than or equal to the reference amplitude size is longer than the designated length, the electronic device 101 may proceed to operation 1005 to process the audio signal in the state where the range of the volume is set to have the first resolution. For example, the processor 120 may process the audio signal in the state where the range of the volume is set to have the first resolution (for example, the first bit) by using the audio module 170. In another example, when a previous setting of the audio module 170 is the second resolution, the processor 120 may re-set the audio module 170 to have the first resolution, and may process the audio signal on the basis of the re-set first resolution. In still another example, the processor 120 may select the first codec 320 of FIG. 3B, and may process the audio signal by using the first codec 320 set to have the first resolution.

On the other hand, when the continuous length of the audio signal having the amplitude size greater than or equal to the reference amplitude size is shorter than the designated length, the electronic device 101 may proceed to operation 1007 to process the audio signal in the state where the range of the volume is set to have the second resolution. For example, the processor 120 may process the audio signal in the state where the range of the volume is set to have the second resolution (for example, the second bit) by using the audio module 170. In another example, when a previous setting of the audio module 170 is the first resolution, the processor 120 may re-set the audio module 170 to have the second resolution, and may process the audio signal on the basis of the re-set second resolution. In still another example, the processor 120 may select the second codec 330 of FIG. 3B, and may process the audio signal by using the second codec 330 set to have the second resolution.

The electronic device 101 may return to perform operation 409 of FIG. 4 after completing operation 1005 or 1007. However, this should not be considered as limiting.

Figure 11:
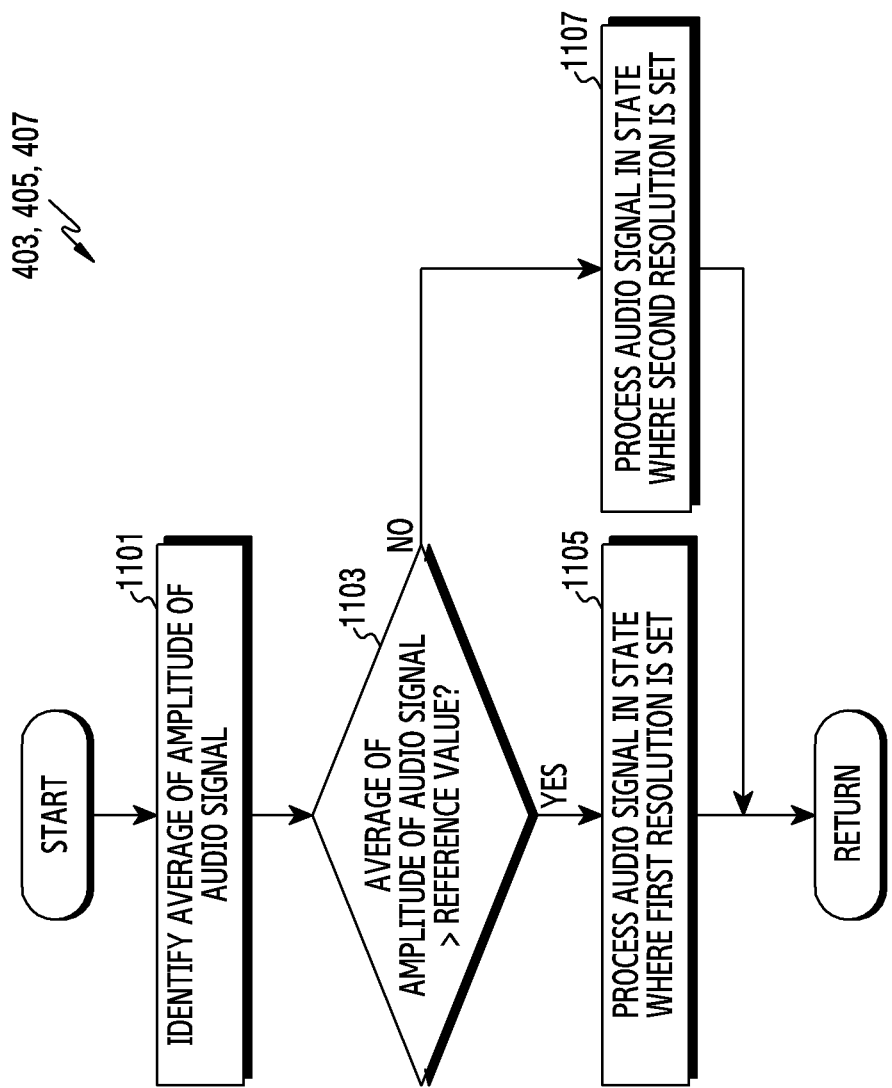
FIG. 11 illustrates a flowchart for processing an audio signal on the basis of an average of amplitudes of the audio signal in an electronic device according to an embodiment of the disclosure.

FIG. 11 is a flowchart for processing an audio signal on the basis of an average of an amplitude of an audio signal in an electronic device according to various embodiments. Hereinbelow, an operation of processing the audio signal in operations 403, 405, and 407 of FIG. 4 will be described. In the following description, the electronic device may include the electronic device 101 of FIG. 1, at least a portion of the electronic device 101 (for example, the processor 120, the sound output device 155), the audio module 170 of FIG. 2, or the processor 120 of FIG. 3.

Referring to FIG. 11, the electronic device 101 may identify an average of an amplitude of an audio signal in operation 1101. For example, the processor 120 may identify the average of the amplitude of the audio signal to be outputted through the audio module 170.

In operation 1103, the electronic device 101 may determine whether the average of the amplitude of the audio signal exceeds a reference value. For example, the reference value may be a median value of the size of the amplitude of the audio signal or a value lower than the median value.

When the average of the amplitude of the audio signal exceeds the reference value, the electronic device 101 may proceed to operation 1105 to process the audio signal in the state where the range of the volume is set to have the first resolution. For example, the processor 120 may set the range of the volume to have the first resolution by setting the audio module 170 of FIG. 1 to have the first bit. For example, the processor 120 may set a quantization bit number applied during quantization of an analogue signal to the first bit. For example, the first hit may be 16 bits.

On the other hand, when the average of the amplitude of the audio signal is lower than the reference value, the electronic device 101 may proceed to operation 1107 to process the audio signal in the state where the range of the volume is set to have the second resolution. For example, the processor 120 may set the range of the volume to have the second resolution h setting the audio module 170 to have the second bit. For example, the processor 120 may set the quantization bit number applied during the quantization of the analogue signal to the second bit. For example, the second bit may be 24 bits or 32 bits.

The electronic device 101 may return to perform operation 409 of FIG. 4 after completing operation 1105 or 1107. However, this should not be considered as limiting.

According to various embodiments, an operating method of an electronic device may include: identifying a setting related to a volume of an audio signal to be outputted by using a sound output device; when the setting related to the volume falls into a first designated range, processing the audio signal in a state where a range of the volume is set to have a first resolution; when the setting related to the volume falls into a second designated range, processing the audio signal in a state where the range of the volume is set to have a second resolution; and outputting the audio signal which is processed in the state where the range of the volume is set to have one corresponding resolution of the first resolution and the second resolution by using the sound output device.

According to various embodiments, the setting related to the volume may include at least one of an audio output level of the sound output device, a size of an amplitude of the audio signal, or an average of the amplitude of the audio signal.

According to various embodiments, the method may include: as at least a portion of the operation of processing the audio signal in the state where the range of the volume is set to have the first resolution, processing the audio signal in a state where a quantization bit of the audio signal is set to a first bit; and, as at least a portion of the operation of processing the audio signal in the state where the range of the volume is set to have the second resolution, processing the audio signal in a state where the quantization bit of the audio signal is set to a second bit.

According to various embodiments, the method may further include: when the audio output level of the sound output device is higher than a reference level, processing the audio signal in a state where the range of the volume is set to have a first bit; and, when the audio output level of the sound output device is lower than the reference level, processing the audio signal in a state where the range of the volume is set to have a second bit.

According to various embodiments, the method may further include: identifying an output state of the sound output device before processing the audio signal at one of the first resolution and the second resolution that is determined; and, when there is no output signal outputted from the sound output device on the basis of a result of the identification, setting the range of the volume to have any one of the first resolution or the second resolution.

According to various embodiments, the method may further include, when the audio signal is outputted from the sound output device on the basis of the result of the identification, setting the range of the volume to have any one of the first resolution or the second resolution at a time that the audio signal which is being outputted finishes.

According to various embodiments, the method may further include: identifying the size of the amplitude of the audio signal; when a continuous length of the audio signal having an amplitude size greater than or equal to a reference amplitude size is longer than a designated length, processing the audio signal in the state where the range of the volume is set to have the first resolution; and, when the continuous length of the audio signal having the amplitude size greater than or equal to the reference amplitude size is shorter than the designated length, processing the audio signal in the state where the range of the volume is set to have the second resolution.

According to various embodiments, the method may further include: identifying the average of the amplitude of the audio signal; when the average of the amplitude of the audio signal is greater than a reference value, processing the audio signal in the state where the range of the volume is set to have the first resolution; and, when the average of the amplitude of the audio signal is less than the reference value, processing the audio signal in the state where the range of the volume is set to have the second resolution.

According to various embodiments, the method may further include: detecting a user input to change the audio output level of the sound output device; and identifying the setting related to the volume of the audio signal to be outputted by using the sound output device, on the basis of the detected user input.

According to various embodiments of the disclosure, a computer readable recording medium may have a program recorded thereon to perform a method, including: identifying a setting related to a volume of an audio signal to be outputted by using a sound output device; when the setting related to the volume falls into a first designated range, processing the audio signal in a state where a range of the volume is set to have a first resolution; when the setting related to the volume falls into a second designated range, processing the audio signal in a state where the range of the volume is set to have a second resolution; and outputting the audio signal which is processed in the state where the range of the volume is set to have one corresponding resolution of the first resolution and the second resolution by using the sound output device.

According to various embodiments, the computer readable recording medium may have the program recorded thereon to perform the method, including: as at least a portion of the operation of processing the audio signal in the state where the range of the volume is set to have the first resolution, processing the audio signal in a state where a quantization bit of the audio signal is set to a first bit; and, as at least a portion of the operation of processing the audio signal in the state where the range of the volume is set to have the second resolution, processing the audio signal in a state where the quantization bit of the audio signal is set to a second bit.

What is claimed is:
1. An electronic device comprising:
a sound output device; and
a processor,
wherein the processor is configured to:

identify a setting related to a volume of an audio signal to be outputted by using the sound output device;
when the setting related to the volume falls into a first designated range, process the audio signal in a state where a range of the volume is set to have a first sampling resolution;
when the setting related to the volume falls into a second designated range, process the audio signal in a state where the range of the volume is set to have a second sampling resolution; and
output the audio signal which is processed in the state where the range of the volume is set to have one corresponding resolution of the first sampling resolution and the second sampling resolution by using the sound output device.

2. The electronic device of claim 1, wherein the processor is configured to identify, as at least a portion of the operation of identifying the setting related to the volume, at least one of an audio output level of the sound output device, a size of an amplitude of the audio signal, or an average of the amplitude of the audio signal.

3. The electronic device of claim 1, wherein the processor is configured to:
as at least a portion of the operation of processing the audio signal in the state where the range of the volume is set to have the first sampling resolution, process the audio signal in a state where a quantization bit of the audio signal is set to a first bit; and
as at least a portion of the operation of processing the audio signal in the state where the range of the volume is set to have the second sampling resolution, process the audio signal in a state where the quantization bit of the audio signal is set to a second bit.

4. The electronic device of claim 2, wherein the processor is configured to:
when the audio output level of the sound output device is higher than a reference level, process the audio signal in a state where the range of the volume is set to have a first bit; and
when the audio output level of the sound output device is lower than the reference level, process the audio signal in a state where the range of the volume is set to have a second bit.

5. The electronic device of claim 1, wherein the processor is configured to:
identify an output state of the sound output device before processing the audio signal at one of the first sampling resolution and the second sampling resolution that is determined; and
when there is no output signal outputted from the sound output device on the basis of a result of the identification of the output state, set the range of the volume to have any one of the first sampling resolution or the second sampling resolution.

6. The electronic device of claim 5, wherein, when the audio signal is outputted from the sound output device on the basis of the result of the identification of the output state, the processor is configured to set the range of the volume to have any one of the first sampling resolution or the second sampling resolution at a time that the audio signal which is being outputted finishes.

7. The electronic device of claim 2, wherein the processor is configured to:
identify the size of the amplitude of the audio signal;
when a continuous length of the audio signal having an amplitude size greater than or equal to a reference amplitude size is longer than a designated length, process the audio signal in the state where the range of the volume is set to have the first sampling resolution; and
when the continuous length of the audio signal having the amplitude size greater than or equal to the reference amplitude size is shorter than the designated length, process the audio signal in the state where the range of the volume is set to have the second sampling resolution.

8. The electronic device of claim 2, wherein the processor is configured to:
identify the average of the amplitude of the audio signal;
when the average of the amplitude of the audio signal is greater than a reference value, process the audio signal in the state where the range of the volume is set to have the first sampling resolution; and
when the average of the amplitude of the audio signal is less than the reference value, process the audio signal in the state where the range of the volume is set to have the second sampling resolution.

9. The electronic device of claim 2, wherein the processor is configured to:
detect a user input to change the audio output level of the sound output device; and
identify the setting related to the volume of the audio signal to be outputted by using the sound output device, on the basis of the detected user input.

10. An operating method of an electronic device, the method comprising:
identifying a setting related to a volume of an audio signal to be outputted by using a sound output device;
when the setting related to the volume falls into a first designated range, processing the audio signal in a state where a range of the volume is set to have a first sampling resolution;
when the setting related to the volume falls into a second designated range, processing the audio signal in a state where the range of the volume is set to have a second sampling resolution; and
outputting the audio signal which is processed in the state where the range of the volume is set to have one corresponding resolution of the first sampling resolution and the second sampling resolution by using the sound output device.

11. The method of claim 10, wherein the setting related to the volume comprises at least one of an audio output level of the sound output device, a size of an amplitude of the audio signal, or an average of the amplitude of the audio signal.

12. The method of claim 10, comprising:
as at least a portion of the operation of processing the audio signal in the state where the range of the volume is set to have the first sampling resolution, processing the audio signal in a state where a quantization bit of the audio signal is set to a first bit; and
as at least a portion of the operation of processing the audio signal in the state where the range of the volume is set to have the second sampling resolution, processing the audio signal in a state where the quantization bit of the audio signal is set to a second bit.

13. The method of claim 11, further comprising:
when the audio output level of the sound output device is higher than a reference level, processing the audio signal in a state where the range of the volume is set to have a first bit; and when the audio output level of the sound output device is lower than the reference level, processing the audio signal in a state where the range of the volume is set to have a second bit.

14. The method of claim 10, further comprising:

identifying an output state of the sound output device before processing the audio signal at one of the first sampling resolution and the second sampling resolution that is determined; and when there is no output signal outputted from the sound output device on the basis of a result of the identification of the output state, setting the range of the volume to have any one of the first sampling resolution or the second sampling resolution.

15. The method of claim 14, further comprising, when the audio signal is outputted from the sound output device on the basis of the result of the identification of the output state, setting the range of the volume to have any one of the first sampling resolution or the second sampling resolution at a time that the audio signal which is being outputted finishes.

16. The method of claim 11, further comprising:

identifying the size of the amplitude of the audio signal;

when a continuous length of the audio signal having an amplitude size greater than or equal to a reference amplitude size is longer than a designated length, processing the audio signal in the state where the range of the volume is set to have the first sampling resolution; and when the continuous length of the audio signal having the amplitude size greater than or equal to the reference amplitude size is shorter than the designated length, processing the audio signal in the state where the range of the volume is set to have the second sampling resolution.

17. The method of claim 11, further comprising:

identifying the average of the amplitude of the audio signal;

when the average of the amplitude of the audio signal is greater than a reference value, processing the audio signal in the state where the range of the volume is set to have the first sampling resolution; and when the average of the amplitude of the audio signal is less than the reference value, processing the audio signal in the state where the range of the volume is set to have the second sampling resolution.

18. The method of claim 11, further comprising:

detecting a user input to change the audio output level of the sound output device; and identifying the setting related to the volume of the audio signal to be outputted by using the sound output device, on the basis of the detected user input.

* * * * *